US011840975B2

(12) United States Patent
Le-Hung

(10) Patent No.: US 11,840,975 B2
(45) Date of Patent: Dec. 12, 2023

(54) METHOD FOR CONTROLLING THE POWER SUPPLY OF SOLENOID FUEL INJECTORS IN A HYBRID MOTOR VEHICLE

(71) Applicants: Continental Automotive France, Toulouse (FR); Continental Automotive GmbH, Hannover (DE)

(72) Inventor: Frédéric Le-Hung, Tournefeuille (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 773 days.

(21) Appl. No.: 15/762,762

(22) PCT Filed: Sep. 29, 2016

(86) PCT No.: PCT/FR2016/052478
§ 371 (c)(1),
(2) Date: Mar. 23, 2018

(87) PCT Pub. No.: WO2017/055751
PCT Pub. Date: Apr. 6, 2017

(65) Prior Publication Data
US 2019/0078526 A1    Mar. 14, 2019

(30) Foreign Application Priority Data

Sep. 30, 2015 (FR) ........................... 1559244

(51) Int. Cl.
*F02D 41/40* (2006.01)
*F02D 41/20* (2006.01)
(Continued)

(52) U.S. Cl.
CPC ............. *F02D 41/20* (2013.01); *B60K 6/485* (2013.01); *B60L 58/20* (2019.02); *B60W 10/06* (2013.01);
(Continued)

(58) Field of Classification Search
CPC ................... F02D 41/20; F02D 41/402; F02D 2041/2003; F02D 2200/021;
(Continued)

(56) References Cited

U.S. PATENT DOCUMENTS 7,448,363 B1 * 11/2008 Rasmussen ........... F02D 41/062
123/179.17
7,610,891 B2 * 11/2009 Seufert .................. B60K 6/405
123/179.25
(Continued)

FOREIGN PATENT DOCUMENTS

DE    102008043381 A1    5/2010
DE    102010040123 A1    3/2011
(Continued)

OTHER PUBLICATIONS

International Search Report and Written Opinion for International Application No. PCT/FR2016/052478, dated Jan. 20, 2017, 10 pages.

*Primary Examiner* — Hunter B Lonsberry
*Assistant Examiner* — Daniel M. Robert
(74) *Attorney, Agent, or Firm* — RatnerPrestia

(57) ABSTRACT

A method for controlling the electrical power supply of injectors for a hybrid automotive vehicle, including an internal combustion engine and an electric motor. A first electrical network, having a first DC voltage, supplies power to a motor control of the engine. A second electrical network having a second DC voltage, higher than the first DC voltage, supplies power to the electric motor. The method includes connecting the second DC voltage to the injectors; reading the value of the second DC voltage; adapting control parameters of the injectors based on the value of engine speed, engine temperature and injection pressure upstream of the injectors; and controlling the injectors using the second DC voltage. Wherein there is no change in the (Continued)

control parameters when the value is higher than a threshold value; and changing at least one of the control parameters when the value is lower than the threshold value.

7 Claims, 1 Drawing Sheet

(51) Int. Cl.
| | | |
|---|---|---|
| *H01F 7/18* | (2006.01) | |
| *H02J 7/14* | (2006.01) | |
| *B60L 58/20* | (2019.01) | |
| *B60K 6/485* | (2007.10) | |
| *B60W 10/06* | (2006.01) | |
| *F02N 11/08* | (2006.01) | |

(52) U.S. Cl.
CPC ................. *H01F 7/18* (2013.01); *H02J 7/14* (2013.01); *F02D 41/402* (2013.01); *F02D 2041/2003* (2013.01); *F02D 2200/021* (2013.01); *F02D 2200/0602* (2013.01); *F02D 2200/101* (2013.01); *F02D 2200/503* (2013.01); *F02D 2400/16* (2013.01); *F02N 11/0866* (2013.01); *Y02T 10/70* (2013.01)

(58) Field of Classification Search
CPC ....... F02D 2200/0602; F02D 2200/101; F02D 2200/503; F02D 2400/16; B60L 58/20; H02J 7/14; H02J 2310/48; H01F 7/18; B60K 6/485; B60W 10/06; Y02T 10/7005; Y02T 10/7066; F02N 11/0866
See application file for complete search history.

(56) References Cited

U.S. PATENT DOCUMENTS

| | | | |
|---|---|---|---|
| 2009/0217914 A1* | 9/2009 | Casasso | ................. F02D 41/20 123/490 |
| 2015/0260121 A1* | 9/2015 | Courtiel | ................. F02D 41/40 123/295 |
| 2016/0115895 A1* | 4/2016 | Ochi | .................. F02D 41/3017 123/305 |
| 2016/0208764 A1* | 7/2016 | Mann | ...................... F02P 5/152 |

FOREIGN PATENT DOCUMENTS

| | | | |
|---|---|---|---|
| DE | 102014216521 A1 * | 3/2015 | ............. F02D 41/20 |
| DE | 102014216521 A1 | 3/2015 | |
| EP | 1876340 A2 | 1/2008 | |
| EP | 2083159 A1 * | 7/2009 | ............. F02D 41/20 |
| EP | 2083159 A1 | 7/2009 | |
| WO | 2014207523 A2 | 12/2014 | |

* cited by examiner

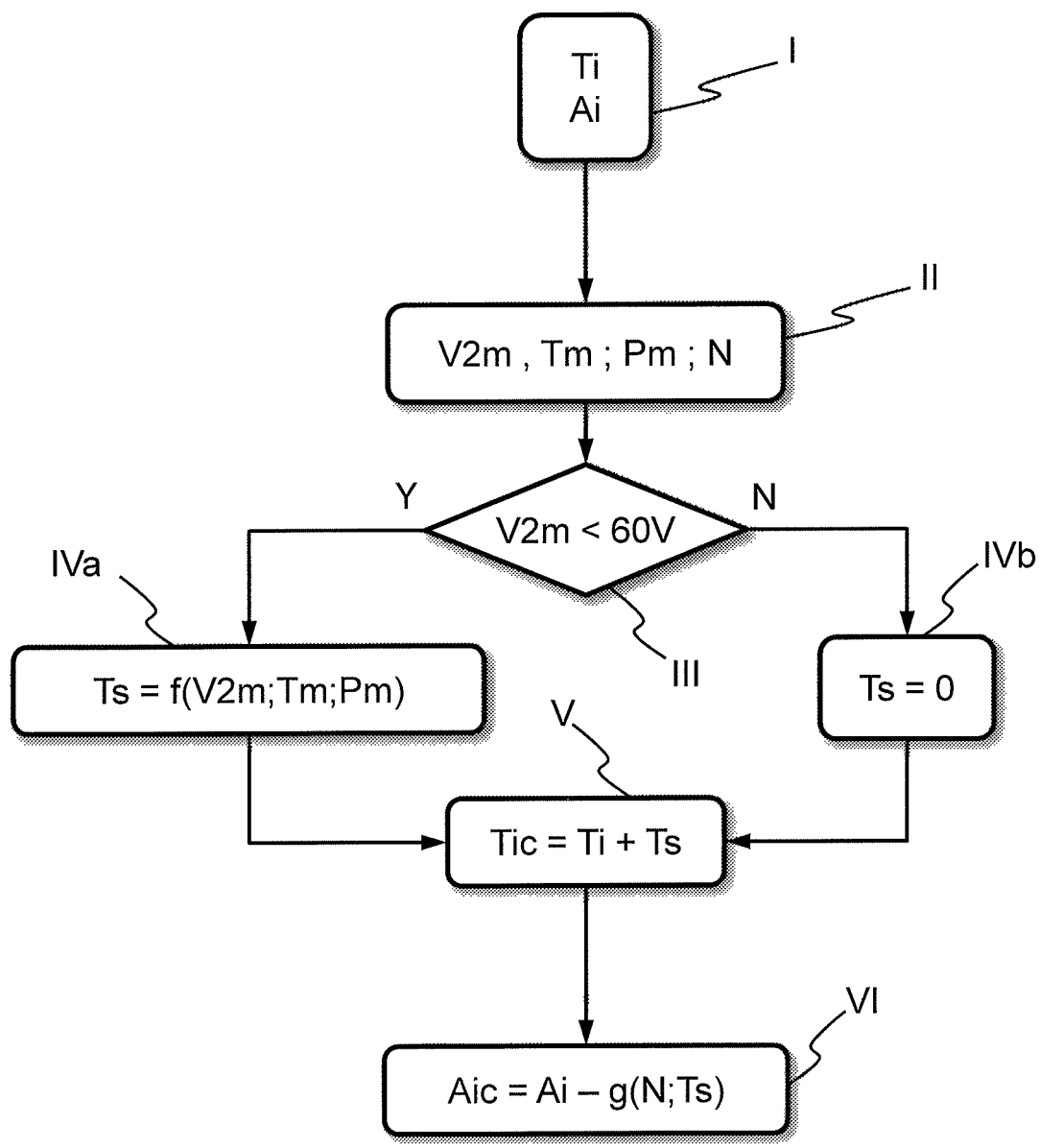

METHOD FOR CONTROLLING THE POWER SUPPLY OF SOLENOID FUEL INJECTORS IN A HYBRID MOTOR VEHICLE

CROSS REFERENCE TO RELATED APPLICATIONS

This application is the U.S. National Phase application of PCT International Application No. PCT/FR2016/052478, filed Sep. 29, 2016, which claims priority to French Patent Application No. 1559244, filed Sep. 30, 2015, the contents of such applications being incorporated by reference herein.

FIELD OF THE INVENTION

The subject matter of the present invention is a method for controlling the electrical power supply of solenoid fuel injectors for a hybrid automotive vehicle including both an internal combustion propulsion engine and an electric motor.

Aspects of the invention have highly advantageous applications in that it makes it possible to omit the voltage boost stages required in the embodiments of the prior art.

BACKGROUND OF THE INVENTION

In both hybrid and conventional automotive vehicles fitted with an internal combustion propulsion engine with solenoid fuel injectors, said solenoid injectors are powered at a voltage arising from the DC voltage powering the automotive vehicle. Typically, this voltage is delivered by the battery of said automotive vehicle and has a value of 12 V. However, such a low DC voltage does not allow the solenoid fuel injectors to be actuated. A DC voltage booster is then used, which raises the voltage from 12 V to about 65 V. In a modern engine with gasoline direct injection, the injectors are thus controlled by means of a switched-mode power supply, which is generally incorporated within the engine control computer.

This switched-mode power supply is expensive, both in terms of price and in terms of space taken up. Within the housing for the engine control computer, it is necessary to incorporate large components which are additionally a source of a large amount of thermal power given off during their operation, and there is reason to design an electronics housing allowing all of this heat energy to be removed without endangering the other components of the engine control computer.

SUMMARY OF THE INVENTION

An aspect of the invention aims to omit such a DC voltage booster in the context of hybrid vehicles fitted with an electric motor which have a second electrical network, powered at a voltage higher than 12 V but nevertheless lower than the 65 V of a voltage booster.

The chosen illustrative example, which is entirely non-limiting with regard to the scope of aspects of the invention, is that of a vehicle provided with a device referred to as a "mild-hybrid" device in the jargon of the field, that is to say a vehicle including an internal combustion propulsion engine and an electric motor which is not directly used for propulsion, but is intended to assist the internal combustion propulsion engine. The electric motor is responsible for recovering energy in the deceleration phases of the vehicle to transform it into electricity that is stored in batteries of accumulators. This energy is subsequently used to assist the internal combustion propulsion engine when necessary, in the start-up or acceleration phases for example.

This exemplary embodiment in no way excludes the possibility of aspects of the invention being applied to a vehicle including two propulsion motors, also referred to as a "full-hybrid" vehicle in the jargon of the field.

To this end, an aspect of the invention provides a method for controlling the electrical power supply of solenoid fuel injectors for a hybrid automotive vehicle, including both an internal combustion propulsion engine and an electric motor, said hybrid automotive vehicle being provided with a first electrical network powered at a first DC voltage that is intended in particular to supply power to a motor control of the internal combustion propulsion engine and a second electrical network powered at a second DC voltage, said second DC voltage being higher than the first DC voltage and intended in particular to supply power to the electric motor, said method being noteworthy in that it includes the following steps:

i. connecting the second DC voltage to the electrical power supply of the solenoid fuel injectors;

ii. reading the value of the second DC voltage;

iii. adapting the control parameters of the solenoid fuel injectors on the basis of the value read in step ii, of an engine speed (N) of the internal combustion propulsion engine (MCI), of a temperature (Tm) of the internal combustion propulsion engine (MCI) and of an injection pressure (Pm) upstream of the solenoid fuel injectors;

iv. controlling the solenoid fuel injectors using the second DC voltage (V2), wherein:

iv.a. there is no change in the injector control parameters when the value (V2m) is higher than a threshold value; and iv.b. at least one of the injector control parameters is changed when the value (V2m) is lower than the threshold value.

The Applicant has observed, surprisingly and contrary to received ideas, that the supply voltage of the electric motor, which currently is typically a DC voltage of 48 V, may be sufficient for controlling solenoid fuel injectors if the injection parameters are adapted to the voltage that is actually available. Specifically, said voltage of 48 V is not constant and may drop quite substantially below its nominal value according to the operating phases of the electric motor, which draw to a greater or lesser degree on the on-board batteries of accumulators that are responsible for delivering this voltage. Aspects of the invention therefore judiciously allows this to be taken into account.

Advantageously, the step of adapting the control parameters of the solenoid fuel injectors takes into account the engine speed of the internal combustion propulsion engine, the temperature of the internal combustion propulsion engine and the injection pressure upstream of the solenoid fuel injectors. Thus, to optimize the adaption of the control parameters of the solenoid injectors further, an aspect of the invention allows not only the available DC voltage to be taken into account, but also the engine speed of the internal combustion propulsion engine. Specifically, a high engine speed substantially decreases the possible fuel injection times. Similarly, the temperature of the internal combustion propulsion engine, which is typically that of the coolant thereof, also affects the characteristics of said engine. Lastly, it is also important to determine, in real time, the fuel pressure upstream of the solenoid fuel injectors, since this quantity determines the injectable fuel rate and hence the opening times of the solenoid fuel injectors.

In one embodiment, the control parameters of the solenoid injectors are the fuel injection time and the engine angle at the start of fuel injection.

Preferably, for an internal combustion propulsion engine including strategies of multiple fuel injections per cylinder within one and the same operating cycle, the step of adapting the control parameters of the solenoid fuel injectors includes a step of testing the consistency of the adapted control parameters:

if said consistency test of the adapted control parameters is passed, then multiple injections are applied;

if said consistency test of the adapted control parameters is failed, then the number of multiple injections is decreased, or else replaced with a single injection per cylinder within one and the same operating cycle.

Specifically, modern engines do not systematically inject the fuel into the internal combustion propulsion engine all at once, rather it is injected in several stages so as to optimize fuel combustion. If the conditions are no longer suitable for multiple injections, then it is possible, by virtue of an aspect of the invention, to decrease the number thereof or to switch to a single injection of fuel.

An aspect of the invention also relates to a recording medium that can be read by a computer, on which a computer program is recorded comprising program code instructions for executing the steps of the method according to any one of the preceding features.

Lastly, an aspect of the invention relates to an electronic computer for a hybrid automotive vehicle including both an internal combustion propulsion engine and an electric motor, which is noteworthy in that it includes means for implementing a method for controlling the electrical power supply of solenoid fuel injectors according to the features mentioned above.

BRIEF DESCRIPTION OF THE DRAWINGS

Aspects of the invention will be better understood upon reading the following description. This description is purely illustrative and should be read with reference to the appended drawings, in which FIG. 1 shows a flow diagram presenting the various steps of a method according to an aspect of the invention.

It should be noted that if the FIGURE provides a detailed disclosure of the invention for its implementation, said FIGURE may of course serve to define an aspect of the invention better, as the case may be.

DETAILED DESCRIPTION OF THE PREFERRED EMBODIMENTS

In the description, the same numerical references denote identical or functionally similar elements.

The method according to an aspect of the invention implements multiple hardware or software components and multiple agents, to which reference will be made throughout the remainder of the description.

In the description, actions are assigned to devices or to programs; this means that these actions are executed by a microprocessor of this device or of the device including the program, said microprocessor then being controlled by instruction codes recorded in a memory of the device. These instruction codes allow the means of the device to be implemented, and therefore allow the undertaken action to be carried out.

FIG. 1 shows a flow diagram implemented by a method for controlling the electrical power supply of solenoid fuel injectors for a hybrid automotive vehicle, including both an internal combustion propulsion engine MCI and an electric motor ME, said hybrid automotive vehicle being provided with a first electrical network powered at a first DC voltage V1 that is intended in particular to supply power to the motor control of the internal combustion propulsion engine MCI and a second electrical network powered at a second DC voltage V2, said second DC voltage V2 being higher than the first DC voltage V1 and intended in particular to supply power to the electric motor ME.

By way of illustrative example, which is in no way limiting with regard to the scope of an aspect of the invention, the value of the first DC voltage V1 is 12 V and it arises from a battery of lead-acid accumulators and the value of the second DC voltage V2 is 48 V and it arises from a battery of lithium-ion accumulators.

The parameters that an aspect of the invention proposes adapting are the fuel injection time Ti and the angle at the start of injection Ai (step I).

Specifically, if the voltage varies, because an aspect of the invention proposes working with the DC voltage delivered by the battery of accumulators powering the electric motor ME, then it is necessary to take into account the fact that the charging time for the inductance of a solenoid fuel injector will vary with the DC voltage that is actually applied. For an assembly of the prior art powering the solenoid injectors at a known and stabilized voltage, this accounting and adaption is not essential.

An aspect of the invention therefore proposes starting with the nominal settings stored in the memory of the engine control computer, for example, and adapting them according to the voltage measured in real time. This value of the second DC voltage V2 measured in real time is referred to as the second available DC voltage V2m.

In step II, the second available DC voltage V2m, along with the engine temperature Tm, the pressure Pm upstream of the solenoid injectors and the engine speed N, are therefore measured.

The engine temperature Tm may be deduced from the temperature of the coolant of the internal combustion propulsion engine MCI, which is typically a parameter tracked by the engine control computers and therefore does not require an additional sensor. This parameter affects the quality of combustion in the cylinders and may lead to the retained injection parameters being corrected.

It is also important to track the pressure Pm upstream of the solenoid injectors, since the rate of the solenoid injectors, and hence the volume injected for a given solenoid injector opening time, may fluctuate. In modern direct injection engines, this pressure Pm is tracked and there is therefore no need to add a sensor to those already present here either.

The engine speed N is also important since it affects the time available for carrying out injections. It is one of the basic quantities tracked in an engine control computer.

It is therefore possible, by using quantities that are available and tracked by the engine control computer, to have an accurate insight into the operating conditions of the internal combustion propulsion engine MCI a short time before the solenoid injector is activated.

In step III, the second available DC voltage V2m is evaluated by comparing it with a threshold. In the illustrated example in which the nominal control voltage of the solenoid injectors is 65 V, the threshold value is 60 V.

If the second available DC voltage V2m is higher than or equal to this threshold of 60 V, then there is no need to correct the injection parameters. The compensation time Ts is set to 0 in step IVb, such that the corrected injection time Tic defined in step V by: Tic=Ti+Ts is identical to the initial injection time Ti.

If the second available DC voltage V2m is lower than this threshold of 60 V, then the injection parameters need to be corrected. The compensation time Ts is calculated by taking into account the previously measured influencing factors, i.e. the engine temperature Tm, the pressure Pm upstream of the solenoid injectors and the engine speed N (step IVa). This corrective factor, the compensation time Ts, is denoted by Ts=f(V2m; Tm; Pm). The corrected injection time Tic defined in step V by: Tic=Ti+Ts is then established.

Step VI makes it possible to compute the corrected angle at the start of injection Aic, defined on the basis of the angle at the start of injection Ai established in step I, decreased by a corrective factor which depends on the compensation time Ts and on the engine speed N, denoted by g (N; Ts).

These corrective factors may be established on the basis of computing laws or else nomograms drawn up for each type of engine during trials.

The two corrected parameters, i.e. the corrected injection time Tic and the corrected angle at the start of injection Aic, are then used by the engine control computer of the internal combustion propulsion engine MCI to monitor the electrical power supply of the solenoid injectors, which are directly powered by the second DC voltage V2.

In one advantageous variant, in the case of an internal combustion propulsion engine MCI including strategies of multiple fuel injections per cylinder within one and the same operating cycle, the introduction of a consistency test is proposed to determine whether or not the envisaged number of multiple injections is possible.

If the consistency test of the adapted control parameters is passed, i.e. if the established total injection time is compatible with the time provided by the operating conditions of the internal combustion propulsion engine MCI, then the number of envisaged multiple injections is kept.

If the consistency test of the adapted control parameters is failed, i.e. if the established total injection time is longer than the time provided by the operating conditions of the internal combustion propulsion engine MCI, then the number of envisaged multiple injections is decreased, even if that means limiting it to a single injection in the least favorable situation.

An aspect of the present invention also covers a recording medium that can be read by a computer, on which a computer program is recorded comprising program code instructions for executing the steps of the method as described above.

Lastly, an aspect of the invention relates to an electronic computer for a hybrid automotive vehicle including both an internal combustion propulsion engine MCI and an electric motor ME, which is noteworthy in that it includes means for implementing a method for controlling the electrical power supply of solenoid fuel injectors according to the features mentioned above.

It should be noted that an aspect of the invention may easily be adapted to actuators within the automotive vehicle other than just the solenoid injectors described above, without departing from the scope of the present invention.

It should also be noted that an aspect of the invention is not applicable such as described to a scenario in which the second DC voltage is substantially higher than the maximum permissible voltage for the solenoid injectors (such as the case of electric motors powered at a voltage of 400 V for example). In such a scenario it would be necessary to provide a voltage buck device if the second DC voltage V2 risked damaging the solenoid injectors.

The invention claimed is:

1. A method for controlling the electrical power supply of solenoid fuel injectors for a hybrid automotive vehicle, including both an internal combustion propulsion engine and an electric motor, said internal combustion propulsion engine performing multiple fuel injections per cylinder within an operating cycle, said hybrid automotive vehicle being provided with a first electrical network powered at a first DC voltage that is intended to supply power to a motor control of the internal combustion propulsion engine and a second electrical network powered at a second DC voltage, said second DC voltage being higher than the first DC voltage and intended to supply power to the electric motor, said method comprising:
   i. connecting the second DC voltage to the electrical power supply of the solenoid fuel injectors;
   ii. reading the value of the second DC voltage;
   iii. adapting the control parameters of the solenoid fuel injectors on the basis of the value read in step ii, of an engine speed of the internal combustion propulsion engine, of a temperature of the internal combustion propulsion engine and of an injection pressure upstream of the solenoid fuel injectors;
   iv. controlling the solenoid fuel injectors using the second DC voltage, wherein:
      iv.a. there is no change in the injector control parameters when the value is higher than or equal to a threshold value; and
      iv.b. at least one of the injector control parameters is changed when the value is lower than the threshold value, the at least one of the injector control parameters of the solenoid injectors including fuel injection time;
   v. performing a consistency test of the adapted control parameters, the consistency test including determining if a total fuel injection time of the adapted control parameters is longer than a time available for the operating cycle of the internal combustion propulsion engine; and
   vi. lowering a number of the multiple fuel injections when the consistency test of the adapted control parameters fails.

2. A non-transitory computer readable recording medium, on which a computer program is recorded comprising program code instructions for executing the steps of the method as claimed in claim 1.

3. An electronic computer for a hybrid automotive vehicle including both an internal combustion propulsion engine and an electric motor, comprising means for implementing a method for controlling the electrical power supply of solenoid fuel injectors as claimed in claim 1.

4. A non-transitory computer readable recording medium, on which a computer program is recorded comprising program code instructions for executing the steps of the method as claimed in claim 2.

5. An electronic computer for a hybrid automotive vehicle including both an internal combustion propulsion engine and an electric motor, comprising means for implementing a method for controlling the electrical power supply of solenoid fuel injectors as claimed in claim 2.

6. An electronic computer for a hybrid automotive vehicle including both an internal combustion propulsion engine and an electric motor, comprising means for implementing a method for controlling the electrical power supply of solenoid fuel injectors as claimed in claim 2.

7. The method as claimed in claim 1, wherein the at least one of the injector control parameters of the solenoid injectors includes engine angle at the start of fuel injection.

\* \* \* \* \*